United States Patent [19]
Hamada et al.

[11] Patent Number: 5,958,613
[45] Date of Patent: *Sep. 28, 1999

[54] POLYMER ELECTROLYTE FUEL CELL AND A POLYMER ELECTROLYTE FUEL CELL SYSTEM WHICH SUPPLY ANODE-SIDE CHANNELS WITH A GAS-LIQUID MIXTURE

[75] Inventors: Akira Hamada; Takaaki Matsubayashi; Toru Nakaoka; Yasuo Miyake, all of Osaka; Toshikazu Nakajima, Fukui, all of Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/621,123

[22] Filed: Mar. 22, 1996

[30] Foreign Application Priority Data

May 18, 1995 [JP] Japan ................................... 7-119418

[51] Int. Cl.$^6$ ................................................. H01M 8/04
[52] U.S. Cl. ................................ 429/26; 429/32; 429/39
[58] Field of Search ............................... 429/13, 26, 30, 429/38, 39, 15, 17, 32

[56] References Cited

U.S. PATENT DOCUMENTS

| | | | |
|---|---|---|---|
| 3,462,308 | 8/1969 | Winters | 429/17 |
| 4,795,683 | 1/1989 | McElroy | 429/13 |
| 4,818,637 | 4/1989 | Molter et al. | 429/15 |
| 4,994,331 | 2/1991 | Cohen | 429/17 |
| 5,262,249 | 11/1993 | Beal et al. | 429/26 |
| 5,322,744 | 6/1994 | Koseki | 429/13 |
| 5,366,818 | 11/1994 | Wilkinson et al. | 429/13 |
| 5,382,478 | 1/1995 | Chow et al. | 429/26 |
| 5,538,811 | 7/1996 | Kanbara et al. | 429/192 |
| 5,543,238 | 8/1996 | Strasser | 429/17 |

FOREIGN PATENT DOCUMENTS

| | | |
|---|---|---|
| 0 301 757 | 2/1989 | European Pat. Off. . |
| 0 328 115 | 8/1989 | European Pat. Off. . |
| 0 499 593 | 8/1992 | European Pat. Off. . |
| 0 629 014 | 12/1994 | European Pat. Off. . |
| 1-140562 | 6/1989 | Japan . |
| 5-41230 | 2/1993 | Japan . |

OTHER PUBLICATIONS

Patent Abstracts of Japan, vol. 009, No. 295, 21 Nov. 1985 re Japanese Publication 60–136178 dated 19 Jul. 1985.
Patent Abstracts of Japan, vol. 013, No. 031, 24 Jan. 1989 re Japanese Publication 63–232273 dated 28 Sep. 1988.

*Primary Examiner*—Stephen Kalafut
*Attorney, Agent, or Firm*—Merchant, Gould, Smith, Edell, Welter & Schmidt, P.A.

[57] ABSTRACT

A polymer electrolyte fuel cell system with a polymer electrolyte fuel cell is made up of a cell main body, a mixture generator for generating a gas-liquid mixture by mixing fuel gas which has been supplied from a fuel gas supply with water, and a means for supplying the gas-liquid mixture to the anode-side channels. The gas-liquid mixture allows the solid-polymer film to be moistened without humidifying fuel gas and oxidant gas with a humidifier, and the cell main body to be cooled down without providing a cooling channel therein.

12 Claims, 6 Drawing Sheets

POLYMER ELECTROLYTE FUEL CELL AND A POLYMER ELECTROLYTE FUEL CELL SYSTEM WHICH SUPPLY ANODE-SIDE CHANNELS WITH A GAS-LIQUID MIXTURE

BACKGROUND OF THE INVENTION

1. Field of the Invention

The present invention is related to a polymer electrolyte fuel cell and a polymer electrolyte fuel cell system.

2. Description of the Related Art

A polymer electrolyte fuel cell is made up of a unit cell composed of an anode layer, a cathode layer, a solid-polymer film disposed therebetween, a member having channels facing the anode layer, and a member which has channels facing the cathode layer.

The polymer electrolyte fuel cell is supplied with fuel gas, for example hydrogen-rich fuel gas, through the anode-side channels, and with oxidizer gas, such as air, through the cathode-side channels, thereby generating electricity through an electro-chemical reaction.

Most polymer electrolyte fuel cells in current use are composed of a plurality of separators and a plurality of unit cells that are stacked alternately in order to obtain a higher voltage. Here, each of the separators has fuel gas channels and oxidizer gas channels.

A problem faced by such polymer electrolyte fuel cells is that the heat generated during operation must be partially removed. Since heat radiation is not enough to maintain a predetermined temperature between about 50° C. and 100° C., most polymer electrolyte fuel cells have to be provided with cooling channels for each group of several unit cells.

As another problem, while a polymer electrolyte fuel cell is in operation, its solid-polymer film must be kept moist to maintain its ion conductivity. The water to be generated from the reaction between the fuel gas and the oxidizer gas contributes to the moistening of the solid-polymer film to some extent. However, since it is not sufficient, additional water must be supplied from outside the cell main body.

In view of these problems, most polymer electrolyte fuel cells are provided with a humidifier outside the cell main body to humidify the fuel gas and the oxidant gas, and further provided with cooling channels within the cell main body.

In contrast, Japanese Patent Publication No. 1-140562 (U.S. Ser. No. 076,970) discloses a polymer electrolyte fuel cell which moistens the solid-polymer film by supplying the fuel gas with water spray using an aspirator, and cools the cell main body by having the supplied water evaporate from the cathode layers.

However, the cooling performance of the water evaporation from the cathode layers is not sufficient for polymer electrolyte fuel cells that are large-sized or have a high output density.

SUMMARY OF THE INVENTION

In view of these problems, the object of the present invention is to provide a polymer electrolyte fuel cell and a polymer electrolyte fuel cell system that moisten the solid-polymer film without providing a humidifier which humidifies the fuel gas or the oxidizer gas, and that cool down the cell main body without providing cooling channels.

The object of the present invention is achieved by a polymer electrolyte fuel cell which comprises the following components:

- a cell main body including a unit cell composed of an anode layer, a cathode layer, and a solid-polymer film disposed between the anode layer and the cathode layer, and a member provided with a plurality of channels facing the anode layer;
- a mixture supply unit that supplies the plurality of channels with a gas-liquid mixture which essentially consists of fuel gas and water; and
- an oxidant gas supply unit that supplies the cathode layer with oxidant gas.

The object of the present invention is also achieved by a polymer electrolyte fuel cell system which comprises the following units:

- a cell main body including a unit cell composed of an anode layer, a cathode layer, and a solid-polymer film disposed between the anode layer and the cathode layer, and a member provided with a plurality of channels facing the anode layer;
- a mixture generator that generates a gas-liquid mixture by mixing water with fuel gas supplied from a fuel gas supply source;
- a mixture supply unit that supplies the plurality of channels with the gas-liquid mixture which has been generated by the mixture generator; and
- an oxidant gas supply unit that supplies the cathode layer with oxidant gas.

The polymer electrolyte fuel cell and the polymer electrolyte fuel cell system of the above-explained construction have no need of providing a humidifier and internal cooling channels. This is because the channels are supplied with the gas-liquid mixture, so that the dispersion performance of the fuel gas onto the anode layers can be improved, and the water can function to cool down the cell main body.

By dispersing the fuel gas in the gas-liquid mixture into the water, the dispersion performance of the fuel gas onto the anode layers can be further improved, and the water can function to cool down the cell main body efficiently.

By forming the cell main body into the alternate stack of the plurality of unit cells and the plurality of plates, the cell main body can be cooled down without a cooling plate.

By bubbling the fuel gas into the water that has been supplied to a manifold, the gas-liquid mixture can be generated within the manifold, and since the gas-liquid mixture is directly distributed among the channels, each channel can be supplied with a well-balanced gas-liquid mixture.

By recovering a gas-liquid mixture which has been used in the cell main body for reproduction, the utilization of fuel gas can be improved because the fuel gas supplier has only to supply the exact amount of gas consumed by the cell reaction.

By separating a recovered gas-liquid mixture into fuel gas and water, the water can be used to generate a new gas-liquid mixture.

By using hydrogen as the fuel gas, the system can perform a stable operation for a long time period because the composition of the fuel gas never changes.

By recycling water which has been obtained in the gas-liquid separator, only the exact amount of water lost mainly in evaporation through the solid-polymer film need be supplied.

By generating a gas-liquid mixture by bubbling fuel gas into water reserved in a water tank, the dispersion performance of the fuel gas and the cooling effects can be both improved because the gas-liquid mixture includes fuel gas which is finely dispersed into the water.

By positioning the exit of each channel as high as or higher than the entrance opening, and by providing the water tank lower than the entrance opening of each channel, the gas-liquid mixture which has been generated by the mixture generator can be supplied to each channel due to the pressure and buoyancy of the gas phase. Consequently, there is no need to provide a pump which supplies the gas-liquid mixture. In addition, by recovering the gas-liquid mixture from the exit of each channel and separating it into fuel gas and water, the fuel gas can be re-used. Consequently, the fuel gas which has been used in the cell main body is circulated to generate electricity, so that the utilization of fuel gas can be improved because the fuel gas supplier has only to supply the exact amount of gas which has been consumed.

By connecting the gas-liquid separation tank and the water tank, water can be circulated for recycle.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiment 1
(The entire construction of the polymer electrolyte fuel cell system 1 of the present embodiment)

Figure 1:
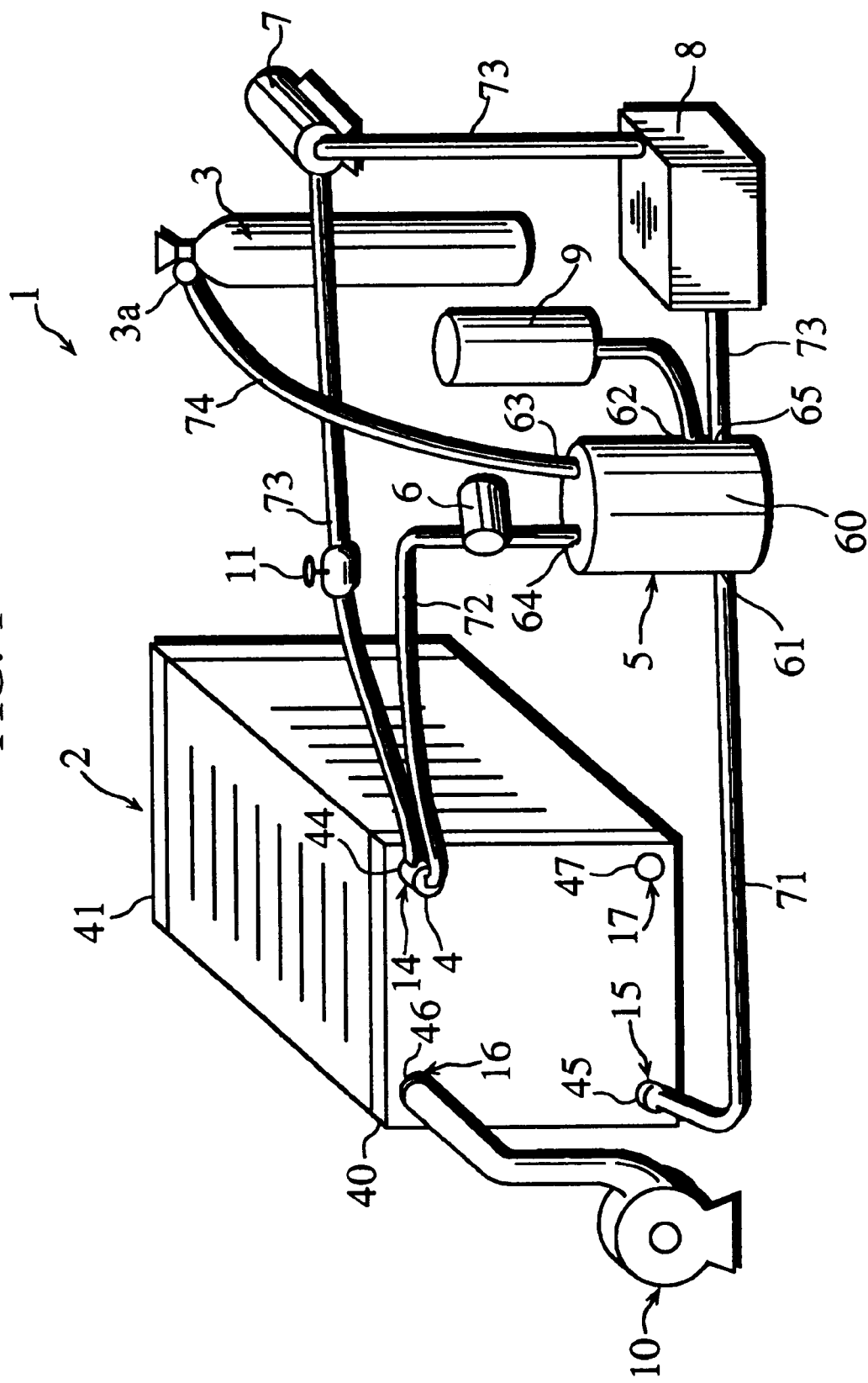
FIG. 1 is a perspective view of the entire construction of the polymer electrolyte fuel cell system of the first embodiment.
Figure 2:
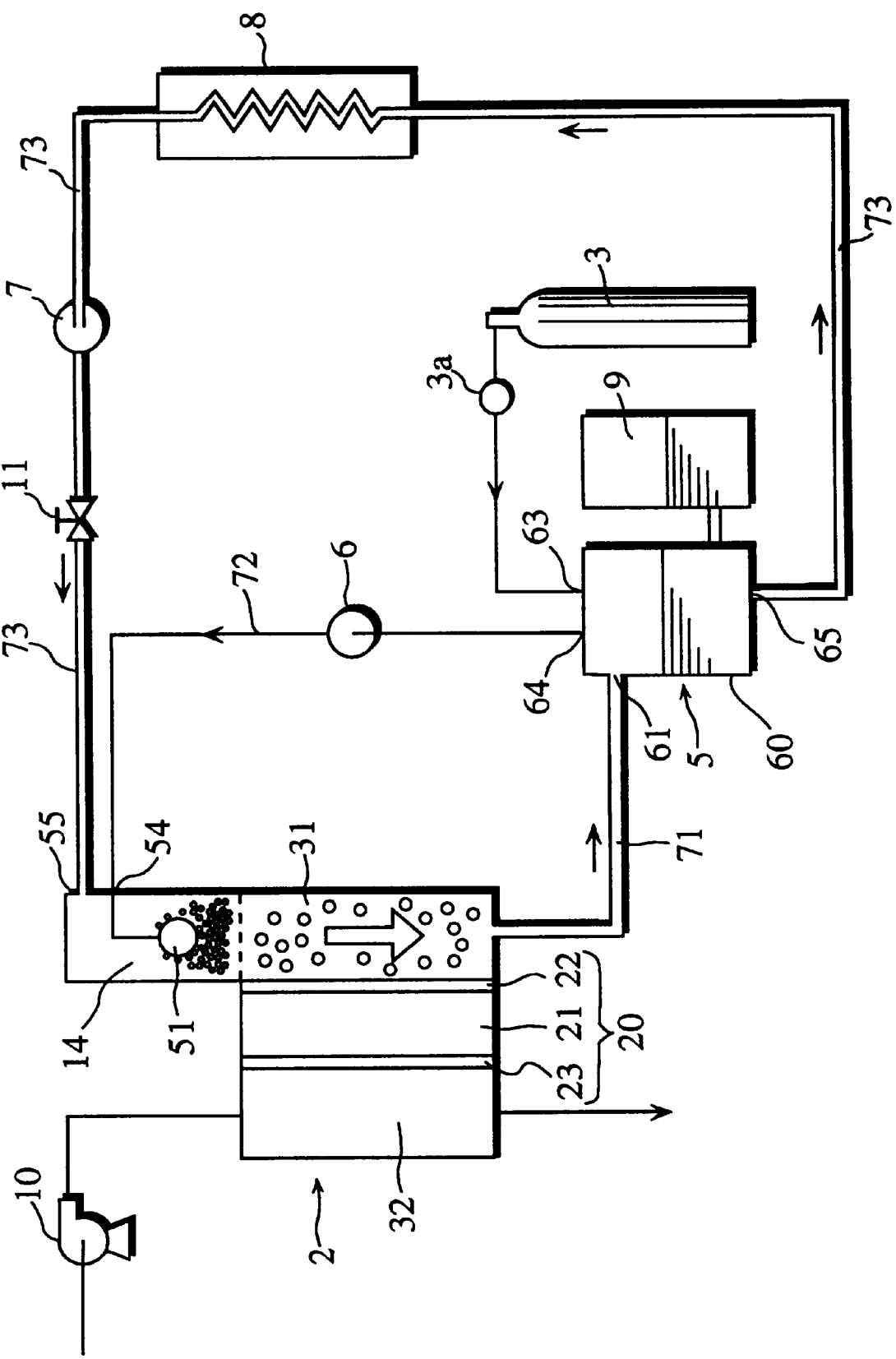
FIG. 2 is a schematic diagram of the polymer electrolyte fuel cell system shown in FIG. 1.

FIG. 1 is a perspective view of the entire construction of the polymer electrolyte fuel cell system 1 of the present embodiment, and FIG. 2 is a schematic diagram thereof.

As shown in these drawings, the polymer electrolyte fuel cell system 1 is composed of a cell main body 2 that generates electricity with air and a gas-liquid mixture, a fuel gas tank 3 as a fuel gas supplier, a gas-liquid mixture unit 4 attached to the cell main body 2 to generate a gas-liquid mixture from fuel gas and water, a gas-liquid separator 5 that recovers the gas-liquid mixture from the cell main body 2 and separates it into a fuel gas layer and a water layer, a fuel gas pump 6 that supplies the gas-liquid mixture unit 4 with fuel gas, a circulating water pump 7 that circulates water within the system 1, a heat exchanger 8 that cools down the circulating water, a water supply tank 9 to supply water, and an air supply fan 10 that supplies the cell main body 2 with air.

In the present embodiment, a hydrogen cylinder is used as the fuel gas tank 3.

Figure 3:
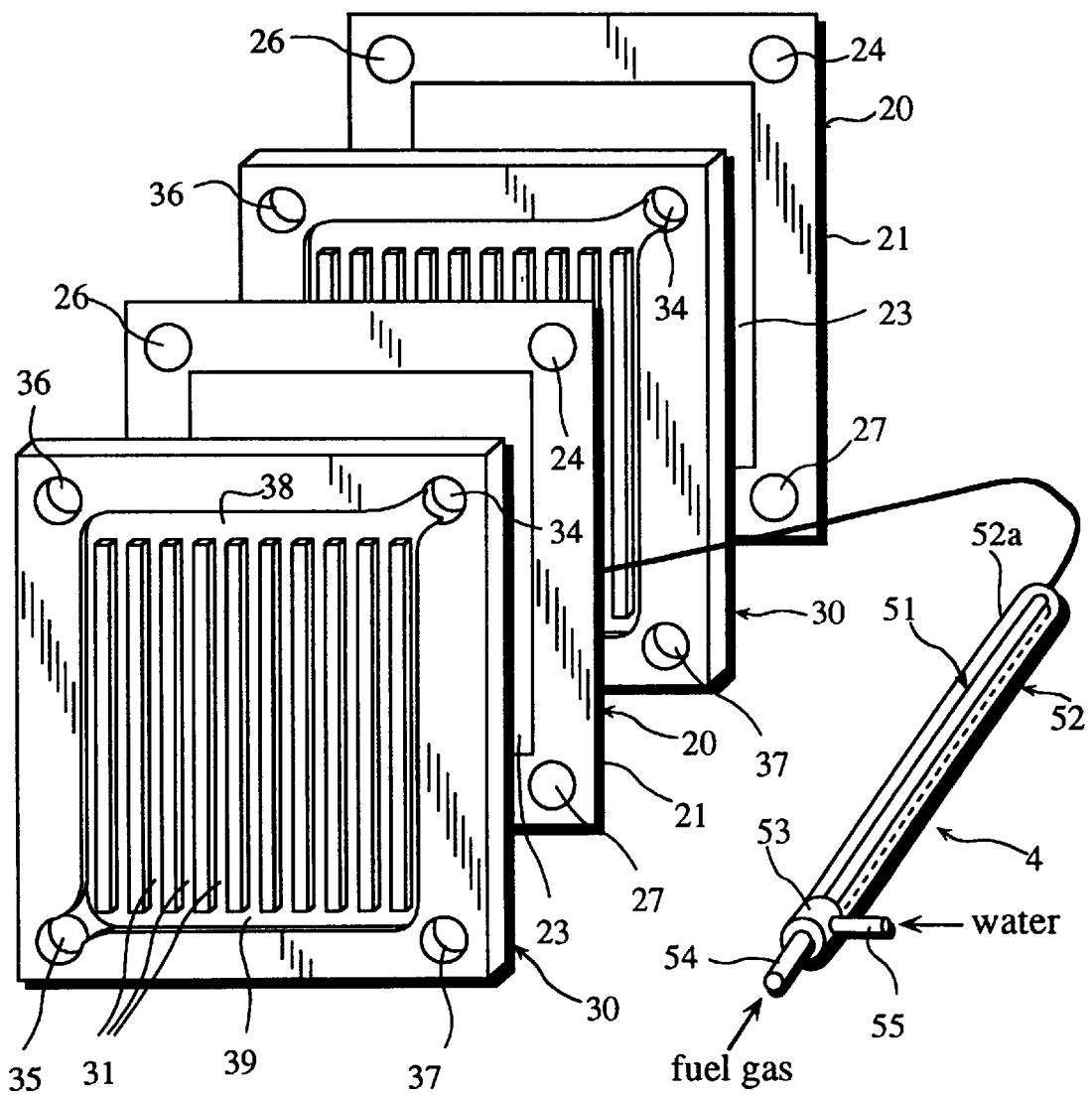
FIG. 3 is an exploded perspective view of the construction of the cell main body 2 and the gas-liquid mixture unit 4.

FIG. 3 is an exploded perspective view of the construction of the cell main body 2 and the gas-liquid mixture unit 4.

Figure 4:
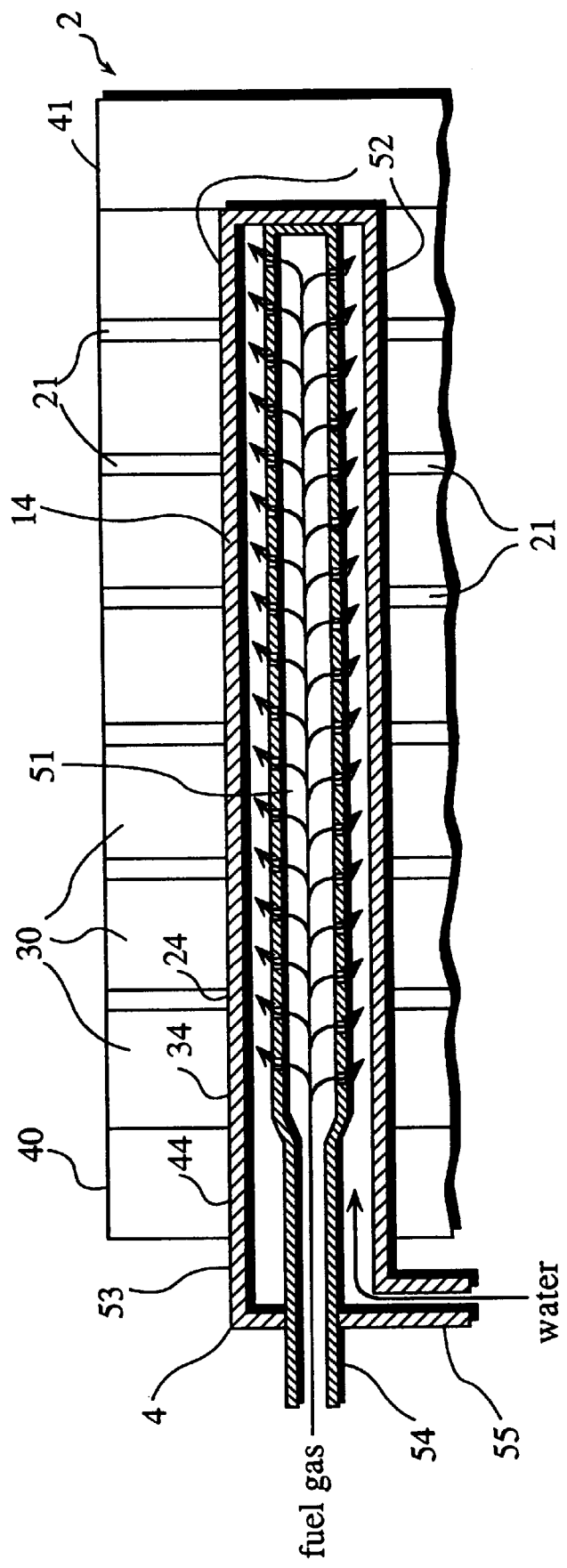
FIG. 4 is a sectional view of the upper manifold 14 and the gas-liquid mixture unit 4.

The cell main body 2 is composed of a plurality of unit cells 20 and a plurality of separators 30 stacked alternately, and a pair of end boards 40 and 41 shown in FIG. 4, which sandwich the alternately stacked unit cells 20 and the separators 30 therebetween. In the present embodiment, there are six unit cells 20 and seven separators 30.

Each of the unit cells 20 includes an anode layer 22 shown in FIG. 2, a cathode layer 23, and a solid polymer film 21 disposed therebetween.

Each separator 30 has an anode-side channel set 31 on the side facing the anode layer 22, and a cathode-side channel set 32 on the other side facing the cathode layer 23 shown in FIG. 2.

In FIG. 3, the anode layers 22 and the cathode-side channel sets 32 are not shown because they are behind the cathode layers 23 and the anode-side channel set 31, respectively.

An unillustrated water repellant current collector is provided between each anode layer 22 and each anode-side channel set 31, and also between each cathode layer 23 and each cathode-side channel set 32.

The solid-polymer films 21 are 0.13 mm thick rectangular films made from Nafion 115 (Du Pont, U.S.A.), and each solid-polymer film 21 has four holes 24–27 at the corners to form internal manifolds.

The anode layers 22 and the cathode layers 23, both of which are made from carbon-supported platinum and have a predetermined thickness, are pressed onto the center of the solid-polymer films 21 with a hot press. The amount of platinum is regulated to be 0.7 mg/cm$^2$.

Each of the separators 30, which are approximately the same size as the solid polymer films 21, has four holes 34–37 at the corners to form the internal manifolds in the same manner as the solid polymer films 21.

The anode-side channel sets 31 are formed in a vertical direction, whereas the cathode-side channel sets 32 are formed in a horizontal direction.

The holes 34 and the holes 35 are diagonally opposite to each other on the separators 30. To connect each hole 34, each hole 35, and each anode-side channel set 31, a manifold groove 38 and a manifold groove 39 are respectively provided above and below the anode-side channel set 31, which runs in the vertical direction.

In the same manner, the holes 36 and the holes 37 are diagonally opposite to each other on the separators 30. To connect each hole 36, each hole 37, and each cathode-side channel set 32, a manifold groove and a manifold groove are provided along either side of the cathode-side channel set 32, which runs in the horizontal direction.

The end board 40 also has four holes 44–47 shown in FIG. 1 so that four cylindrical manifolds 14–17 whose openings are on the end board 40 side are formed in the direction in which the unit cells 20 and the separators 30 are stacked. The upper manifolds 14 and 16 includes the holes 24, 34, and 44, and the holes 26, 36, and 46, respectively. The lower manifolds 15 and 17 have the holes 35 and 45, and the holes 27, 37, and 47, respectively.

In the present embodiment, these manifolds 14, 15, 16, and 17 are used to supply a gas-liquid mixture, to expel the gas-liquid mixture, to supply air, and to expel the air, respectively.

The gas-liquid mixture unit 4, which is positioned inside the upper manifold 14, is composed of a cylindrical bubbler 51 which bubbles fuel gas into water in the upper manifold 14, a cylindrical holder 52 which holds the bubbler 51 inside the upper manifold 14, and a cylindrical stopper 53 to seal the opening of the upper manifold 14.

FIG. 4 is a sectional view of the upper manifold 14 and the gas-liquid mixture unit 4. As shown in FIGS. 3 and 4, the bubbler 51 has approximately the same length as the upper manifold 14 and is made from a sintered metal with a 5 μm mesh diameter. The fuel gas enters the gas-liquid mixture unit 4 via its gas opening 54, which pierces the cylindrical stopper 53, and is evenly dispersed into the water in the cylindrical holder 52.

The cylindrical holder 52, which fits into the upper manifold 14, has a slit 52a along the side which faces the manifold groove 38.

The cylindrical stopper 53 is provided with a water opening 55 through which water enters the cylindrical holder 52. The cylindrical stopper 53 seals the opening of the upper manifold 14 when it is fitted into the hole 44 of the end board 40.

The following will be explained with reference to FIGS. 1 and 2 again.

The gas-liquid separator 5 is composed of a sealed container 60, a recovered gas-liquid mixture opening 61 on the side, a fuel gas opening 63 and a fuel gas exit 64 on the top, and a water opening 62 and a water exit 65 at the bottom.

The recovered gas-liquid mixture opening 61 is connected with the lower manifold 15 via a pipe 71. The fuel gas exit 64 is connected with the gas opening 54 of the gas-liquid mixture unit 4 via a pipe 72, which runs through the fuel gas pump 6. The water opening 65 is connected with the water opening 55 of the cylindrical stopper 53 via a pipe 73, which runs through the circulating water pump 7 and the heat exchanger 8.

The fuel gas opening 63 is connected with the fuel gas tank 3 via a pipe 74 with a pressure regulating valve 3a, which regulates the supply of fuel gas to the sealed container 60 under a predetermined pressure.

(The operation of the polymer electrolyte fuel cell system 1)

In the gas-liquid mixture unit 4, the fuel gas supplied through the gas opening 54 is dispersed into the water supplied through the water opening 55 into the cylindrical holder 52, and as a result, a gas-liquid mixture is generated.

The generated gas-liquid mixture goes through each manifold groove 38, is distributed among the channels of each anode-side channel set 31 while generating electricity, united at each manifold groove 39, and expelled from the lower manifold 15.

While the gas-liquid mixture goes through the anode-side channel sets 31, it moistens the solid polymer films 21, and at the same time cools down the cell main body 2, thus functioning as cooling water.

Since the generated gas-liquid mixture is directly distributed among the channels of each anode-side channel set 31 without going through a pipe, each anode-side channel set 31 is supplied with a well-balanced gas-liquid mixture. The amount of the gas-liquid mixture to be supplied to each anode-side channel set 31, and the ratio between water and fuel gas in the gas-liquid mixture is regulated by changing the amount of water to be supplied with the circulating water pump 7 and the amount of gas to be supplied with the fuel gas pump 6. This regulation enables the function of the gas-liquid mixture as a cooling medium and the security of sufficient fuel gas to the anode layers 22.

As mentioned before, the water repellant current collector provided between each anode layer 22 and each anode-side channel set 31 prevents each anode layer 22 from sinking into the gas-liquid mixture during a long operation. As a result, fuel gas is successfully supplied to the reaction site of each anode layer 22.

The gas-liquid mixture expelled from the lower manifold 15 travels through the pipe 71 to the gas-liquid separator 5 via the recovered mixture opening 61. In the gas-liquid separator 5, the gas-liquid mixture is separated into a fuel gas layer (top layer) and a water layer (bottom layer). The fuel gas supplied from the fuel gas tank 3 is mixed with the fuel gas which has entered the gas-liquid separator 5 through the fuel gas opening 63, recovered as a fuel gas layer, and expelled from the fuel gas exit 64. The fuel gas thus expelled is sent to the gas-liquid mixture unit 4 through the gas opening 54 with the fuel gas pump 6.

On the other hand, the water separated from the fuel gas by the gas-liquid separator 5 is cooled down to a predetermined temperature while it travels through the heat exchanger 8, and enters the gas-liquid mixture unit 4 through the water opening 55 with the circulating water pump 7.

In the gas-liquid mixture unit 4, the fuel gas sent with the fuel gas pump 6 is bubbled into the water sent with the circulating water pump 7, and as a result, a new gas-liquid mixture is generated.

As explained hereinbefore, in the system 1, a new gas-liquid mixture is generated from the gas-liquid mixture recovered from the cell main body 2 and the fuel gas sent from the fuel gas tank 3, and supplied to the cell main body 2.

When the water level in the gas-liquid separator 5 is lowered, water is supplied from the water supply tank 9 through the water supply opening 62, so that the amount of the circulating water is maintained at a certain level even if some water is lost in evaporation while it travels through the unit cells 20 to the cathode-side channel sets 32.

The air supplied by the air supply fan 10 to the upper manifold 16 travels through a manifold groove, is distributed among the channels of each cathode-side channel set 32, united at the manifold groove, and expelled from the lower manifold 17 outside the cell main body 2.

(The effects of the polymer electrolyte fuel cell system 1)

In the system 1, the solid-polymer films 21 are moistened while the gas-liquid mixture travels through the anode-side channel sets 31. Consequently, there is no need for providing a humidifier which humidifies the fuel gas or oxidant gas.

In addition, the gas-liquid mixture which travels through the anode-side channel sets 31 cools down the cell main body 2 by functioning as cooling water. This cooling effect is greater than that is obtained from the evaporation of water from the cathode layers 23.

Furthermore, the gas-liquid mixture to be generated by the gas-liquid mixture unit 4 includes water and fuel gas finely dispersed into the water. Consequently, the water cools the cell main body 2 as efficiently as ordinary cooling water, while the fuel gas is efficiently supplied to the anode layers 22.

EMBODIMENT 2

(The entire construction of the polymer electrolyte fuel cell system 101 of the present embodiment)

Figure 5:
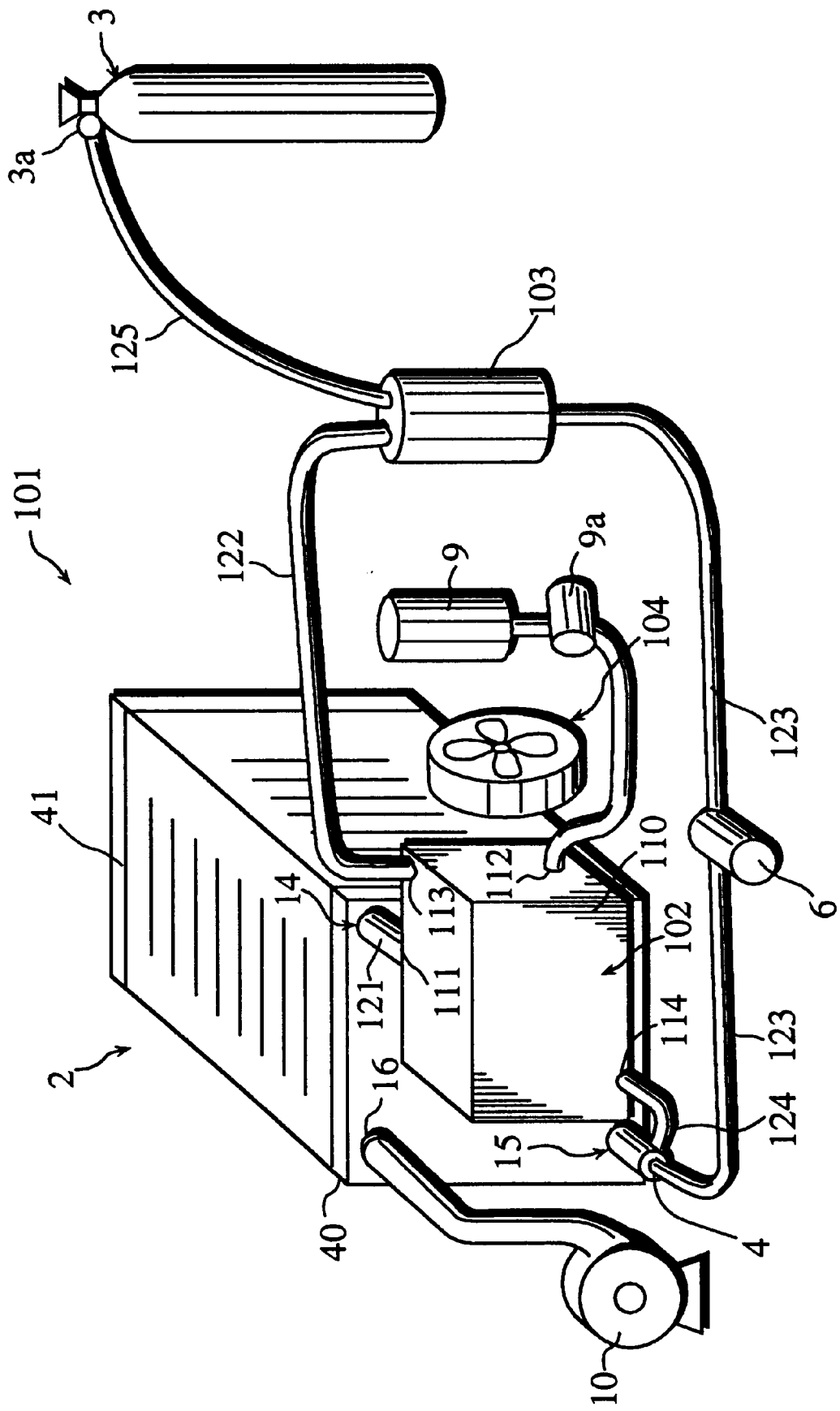
FIG. 5 is a perspective view of the entire construction of the polymer electrolyte fuel cell system of the second embodiment.
Figure 6:
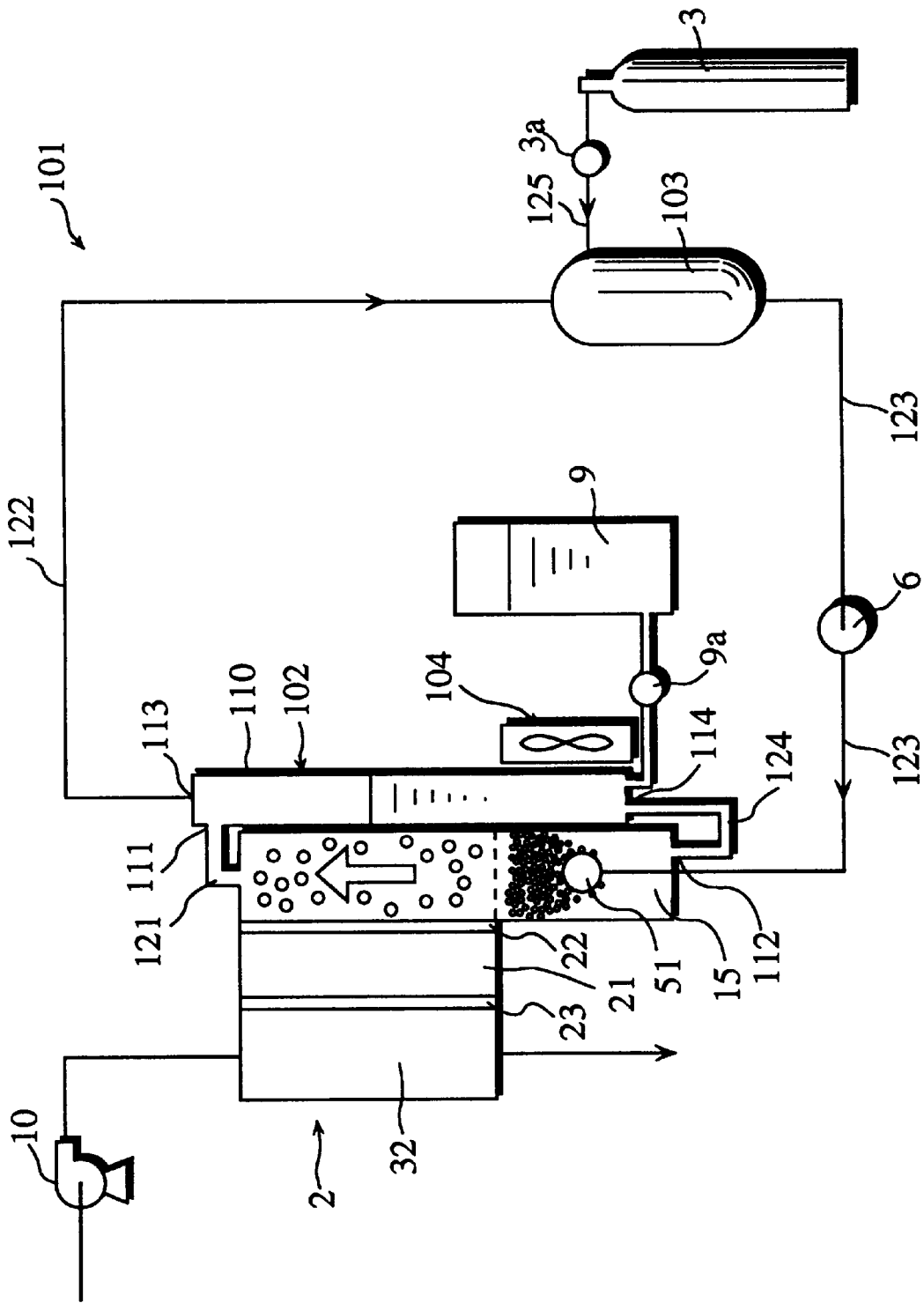
FIG. 6 is a schematic diagram of the system shown in FIG. 5.

FIG. 5 is a perspective view of the entire construction of the polymer electrolyte fuel cell system 101 of the present embodiment, and FIG. 6 is a schematic diagram thereof. In the present embodiment, the like components are labeled with like reference numerals with respect to the first embodiment, and the description of these components is not repeated.

In common with the system 1 of the first embodiment, the polymer electrolyte fuel cell system 101 includes the cell main body 2, the fuel gas tank 3, the gas-liquid mixture unit 4, the fuel gas pump 6, the water supply tank 9, and the air supply fan 10. The system 101 further includes a separation tank 102 which recovers a gas-liquid mixture from the cell main body 2 and separates it into a fuel gas layer and a water layer, a buffer tank 103 which mixes the fuel gas obtained in the separation tank 102 with the fuel gas from the fuel gas tank 3, and a cooling fan 104 which cools down the water layer of the separation tank 102.

In the system 101, the gas-liquid mixture unit 4 is positioned inside the lower manifold 15 of the cell main body 2, and a gas-liquid mixture is expelled from the upper manifold 14, whereas in the system 1 of the first embodiment, the gas-liquid mixture unit 4 is positioned inside the upper manifold 14, and a gas-liquid mixture is expelled from the lower manifold 15.

The separation tank 102 is disposed beside the end board 40, approximately as high as the cell main body 2. The separation tank 102 is composed of a sealed container 110 with a recovered mixture opening 111 on a side surface, a fuel gas exit 113 on a top surface, a supply water opening 112 and a water exit 114 on other side surfaces.

The cooling fan 104 sends air to the bottom of the separation tank 102, thereby cooling the water layer in the separation tank 102 down to a predetermined temperature.

The recovered mixture opening 111 is connected with the upper manifold 14 via a pipe 121. The fuel gas exit 113 is connected with the buffer tank 103 via a pipe 122. The gas opening 54 of the gas-liquid mixture unit 4 is connected with the buffer tank 103 via a pipe 123, which goes through the fuel gas pump 6.

The separation tank 102 and the lower manifold 15 are connected with each other as a result of the water exit 114 and the water opening 55 of the gas-liquid mixture unit 4 being connected with each other via a pipe 124.

The fuel gas tank 3 and the buffer tank 103 are connected with each other via a pipe 125 with the pressure regulating valve 3a. The pressure regulating valve 3a regulates the amount of fuel gas to be supplied into the buffer tank 103 under a fixed pressure.

When the water level of the separator tank 102 is lowered, water is supplied from the water supply tank 9 with a water supply pump 9a, so that the amount of circulating water is maintained at a certain level.

(The operation of the polymer electrolyte fuel cell system 101)

Since the water contained in the separation tank 102 is maintained at a certain level, there is always some water at the bottom of the separation tank 102. Also, the lower manifold 15, which is connected with the separation tank 102, is automatically supplied with water.

In the gas-liquid mixture unit 4, the fuel gas to be supplied through the gas opening 54 is dispersed into the water in the lower manifold 15, and as a result, a gas-liquid mixture is generated.

The gas-liquid mixture thus generated travels upward due to the pressure and buoyancy of the gas phase. To be more specific, the gas-liquid mixture travels through each manifold groove 39, is distributed among the channels of each anode-side channel set 31, goes up along the channels, is united at each manifold groove 38, and is expelled from the upper manifold 14.

The gas-liquid mixture expelled from the upper manifold 14 enters the separation tank 102 via the pipe 121, and is separated into a fuel gas layer (top layer) and a water layer (bottom layer). The fuel gas layer enters the buffer tank 103 via the pipe 122.

In the buffer tank 103, the fuel gas from the fuel gas tank 3 and the fuel gas from the pipe 122 are mixed. The mixed fuel gas is supplied to the gas-liquid mixture unit 4 via the gas opening 54 with the fuel gas pump 6.

On the other hand, the water layer separated from the fuel gas layer in the separation tank 102 is cooled down to a predetermined temperature with the cooling fan 104, and automatically sent to the lower manifold 15 via the water opening 55 through the pipe 124.

In the gas-liquid mixture unit 4, the fuel gas from the buffer tank 103 is dispersed into the water from the separation tank 102, and as a result, a new gas-liquid mixture is generated.

As explained hereinbefore, in the system 101, a new gas-liquid mixture is generated from the gas-liquid mixture recovered from the cell main body 2 and the fuel gas to be supplied from the fuel gas tank 3, and supplied to the cell main body 2.

In the present embodiment, the anode-side channel sets 31 are disposed in the vertical direction; however, the exits may be disposed as high as or higher than the entrance openings because the gas-liquid mixture proceeds by the pressure and buoyancy of the gas phase.

(The effects of the polymer electrolyte fuel cell system 101)

In common with the system 1 of the first embodiment, the solid-polymer films 21 in the system 101 are moistened while the gas-liquid mixture travels through the anode-side channel sets 31, so that there is no need for providing a humidifier which humidifies fuel gas or oxidizer gas.

In addition, the gas-liquid mixture which travels through the anode-side channel sets 31 cools down the cell main body 2 by functioning as cooling water.

In the system 101, the gas-liquid mixture automatically travels through the anode-side channel sets 31 due to the pressure of the fuel gas to be supplied to the gas-liquid mixture unit 4 and the buoyancy of the gas-liquid mixture, so that the circulating water pump 7 of the first embodiment is dispensable.

(Others)

In the present invention, a gas-liquid mixture travels through the channels facing the anode layers 22, and the fuel gas contained in the gas-liquid mixture is supplied to the anode layers 22. The reason of water being supplied in the form of a mixture with fuel gas is that hydrogen as an active principle of the fuel gas has an excellent dispersion performance to allow water be supplied onto the anode layers 22, so that there is no harm on the cell performance.

In contrast, the oxidant gas to be supplied onto the cathode layers 23 has poor dispersion performance, so that supplying it in the form of a mixture with water would decrease the cell performance.

In the above embodiments, hydrogen is used as fuel gas, so that the composition of the fuel gas circulating within the system never changes during a long time operation, which leads to the achievement of a stable cell.

In contrast, when a hydrogen-rich reformed gas is used as fuel gas, the components other than hydrogen are believed to accumulate in the circulating fuel gas during a long time operation. To avoid the accumulation, the circulating fuel gas should preferably be replaced by fresh gas from the fuel gas tank 3 in the case of a long period of operation.

If hydrogen is used as the fuel gas, the system 1 or 101 can perform a stable operation for a long time period because the composition of the fuel gas never changes.

Furthermore, in the cell main body 2 of the above embodiments, the gas-liquid mixture unit 4 is positioned in an internal manifold; however, it may be positioned in an external manifold.

In the above embodiments, a gas-liquid mixture is generated by bubbling fuel gas into water which travels through a manifold with the bubbler 51 made from a sintered metal. However, a spray nozzle or an aspirator may be used instead of the bubbler 51. Furthermore, a gas-liquid mixture generator composed of a water tank and a bubbler may be provided separately from the cell main body 2.

The cell main body 2 of the above embodiments is composed of six unit cells and seven separators stacked alternately; however, the cell main body 2 may be composed of a single unit cell.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A solid-polymer fuel cell system, comprising:
    a cell main body comprising:
        a plurality of unit cells, each of the plurality of unit cells comprising an anode layer, a cathode layer and a solid-polymer film disposed between the anode layer and the cathode layer; and
        a plurality of plates, each provided with a plurality of channels facing a respective anode layer, the plurality of unit cells and the plurality of plates being accumulated alternately, the cell main body being provided with a manifold in communication with each channel of the plurality of plates;
        a gas-liquid mixture generator, which is located in the manifold and is supplied with liquid water and fuel gas separately, for internally generating a gas-liquid mixture and for supplying the plurality of channels with the generated gas-liquid mixture; and
        an oxidizing gas supply in communication with the cathode layers for supplying the cathode layers with oxidizing gas.

2. The solid-polymer fuel cell system of claim 1, wherein the gas-liquid mixture generator generates the gas-liquid mixture by dispersing the fuel gas into the water.

3. The solid-polymer fuel cell system of claim 2, wherein the gas-liquid mixture generator is provided with a water supply means for supplying water and a gas bubbler for bubbling the fuel gas into the water.

4. The solid-polymer fuel cell system of claim 1, wherein the manifold is defined by an aperture in each of said cathode layers, said anode layers, said solid-polymer films and said plates.

5. The solid-polymer fuel cell system of claim 4, wherein each of said plates is provided with a manifold channel member extending from the manifold to the channels of the plate, to deliver gas-liquid mixture from the manifold to the channels.

6. The solid-polymer fuel cell system of claim 1 further comprising:
    a gas-liquid mixture recovery means for recovering a gas-liquid mixture from the plurality of channels; and
    a gas-liquid reproduction means for generating a new gas-liquid mixture from the gas-liquid mixture which has been recovered by the gas-liquid mixture recovery means and fuel gas from a fuel gas supply source, and
    wherein the plurality of channels are supplied with the new gas-liquid mixture which has been generated by the gas-liquid mixture reproduction means.

7. The solid-polymer fuel cell system of claim 6, where in the gas-liquid mixture reproduction means is provided with:
    a gas-liquid separator for separating the gas-liquid mixture which has been recovered by the gas-liquid mixture recovery means into fuel gas and water; and
    a fuel gas supply means for supplying the gas-liquid mixture generator with the fuel gas which has been obtained in the gas-liquid separator together with the fuel gas from the fuel gas supply source.

8. The solid-polymer fuel cell system of claim 7, further comprising a water return means for returning the water which has been obtained in the gas-liquid separator to the gas-liquid mixture generator.

9. The solid-polymer fuel cell system of claim 6, wherein the fuel gas to be supplied from the fuel gas supply source is hydrogen.

10. The solid-polymer fuel cell system of claim 1, wherein each of the plurality of channels has an entrance opening and an exit, the exit being positioned as high as or higher than the entrance opening,
    wherein the gas-liquid mixture generator is provided with a water tank which is provided lower than the opening of each of the plurality of channels and a gas bubbler for bubbling fuel gas into the water reserved in the water tank, and
    wherein the gas-liquid mixture generator supplies the plurality of channels with the gas-liquid mixture by using a pressure of fuel gas to be supplied to the gas-liquid mixture generator and a buoyancy of a gas phase of the gas-liquid mixture which has been generated by the gas-liquid mixture generator.

11. The solid-polymer fuel cell system of claim 10 further comprising:
    a gas-liquid separation tank for recovering the gas-liquid mixture from the exit of each of the plurality of channels, and separating the gas-liquid mixture recovered into fuel gas and water; and
    a fuel gas supply means for supplying the gas-liquid mixture generator with the fuel gas which has been obtained in the gas-liquid separation tank and fuel gas from a fuel gas supply source.

12. The solid-polymer fuel cell system of claim 11, wherein the gas-liquid separation tank is in communication with the water tank.

* * * * *